United States Patent [19]

Ayano et al.

[11] 4,175,218
[45] Nov. 20, 1979

[54] TELEPHONE SWITCHING SYSTEM

[75] Inventors: Mitsutoshi Ayano, Tokyo; Eiji Minamitani, Yokohama, both of Japan

[73] Assignee: Fujitsu Limited, Japan

[21] Appl. No.: 907,197

[22] Filed: May 18, 1978

[30] Foreign Application Priority Data

May 18, 1977 [JP] Japan .................................. 52/57421

[51] Int. Cl.² .............................................. H04B 3/20
[52] U.S. Cl. .............................. 179/170.2; 179/81 A; 179/170.8
[58] Field of Search ............... 179/170.2, 170.4, 170.6, 179/170.8, 1 HF, 1 SW, 81 A, 81 E; 325/38 B

[56] References Cited

U.S. PATENT DOCUMENTS

| 3,769,466 | 10/1973 | von Pfeil et al. .................. 179/170.2 |
| 3,769,466 | 10/1973 | von Pfeil et al. .................. 179/170.2 |
| 3,769,466 | 10/1973 | von Pfeil et al. .................. 179/170.2 |
| 3,821,494 | 6/1974 | Besseyre ............................ 179/170.6 |
| 3,821,494 | 6/1974 | Besseyre ............................ 179/170.6 |
| 3,821,494 | 6/1974 | Besseyre ............................ 179/170.6 |
| 4,005,276 | 1/1977 | Abramson et al. ................ 179/170.8 |
| 4,005,276 | 1/1977 | Abramson et al. ................ 179/170.8 |
| 4,005,276 | 1/1977 | Abramson et al. ................ 179/170.8 |
| 4,081,616 | 3/1978 | Dumont ............................. 179/170.2 |
| 4,081,616 | 3/1978 | Dumont ............................. 179/170.2 |
| 4,081,616 | 3/1978 | Dumont ............................. 179/170.2 |

*Primary Examiner*—Kathleen H. Claffy
*Assistant Examiner*—Randall P. Myers
*Attorney, Agent, or Firm*—Staas & Halsey

[57] ABSTRACT

In the case where a two-wire circuit forming a trunk or a subscriber line of the two-wire system is converted by a hybrid circuit to a four-wire circuit of sending and receiving paths to form a transmission line between subscribers, if an impedance variation on the two-wire side is large, a leak from sending path to receiving path occurs and is amplified to cause singing. To eliminate the singing, a circuit for detecting the impedance fluctuation of the two-wire side is inserted in the two-wire circuit, and switching means inserted in the four-wire circuit is activated by an impedance detecting signal of the detecting circuit to electrically open the four-wire circuit, thereby preventing the singing phenomena. This method does not involve the use of an expensive attenuator which is troublesome to design for the prevention of singing.

10 Claims, 7 Drawing Figures

DELTA MODULATOR TIMING DIAGRAM

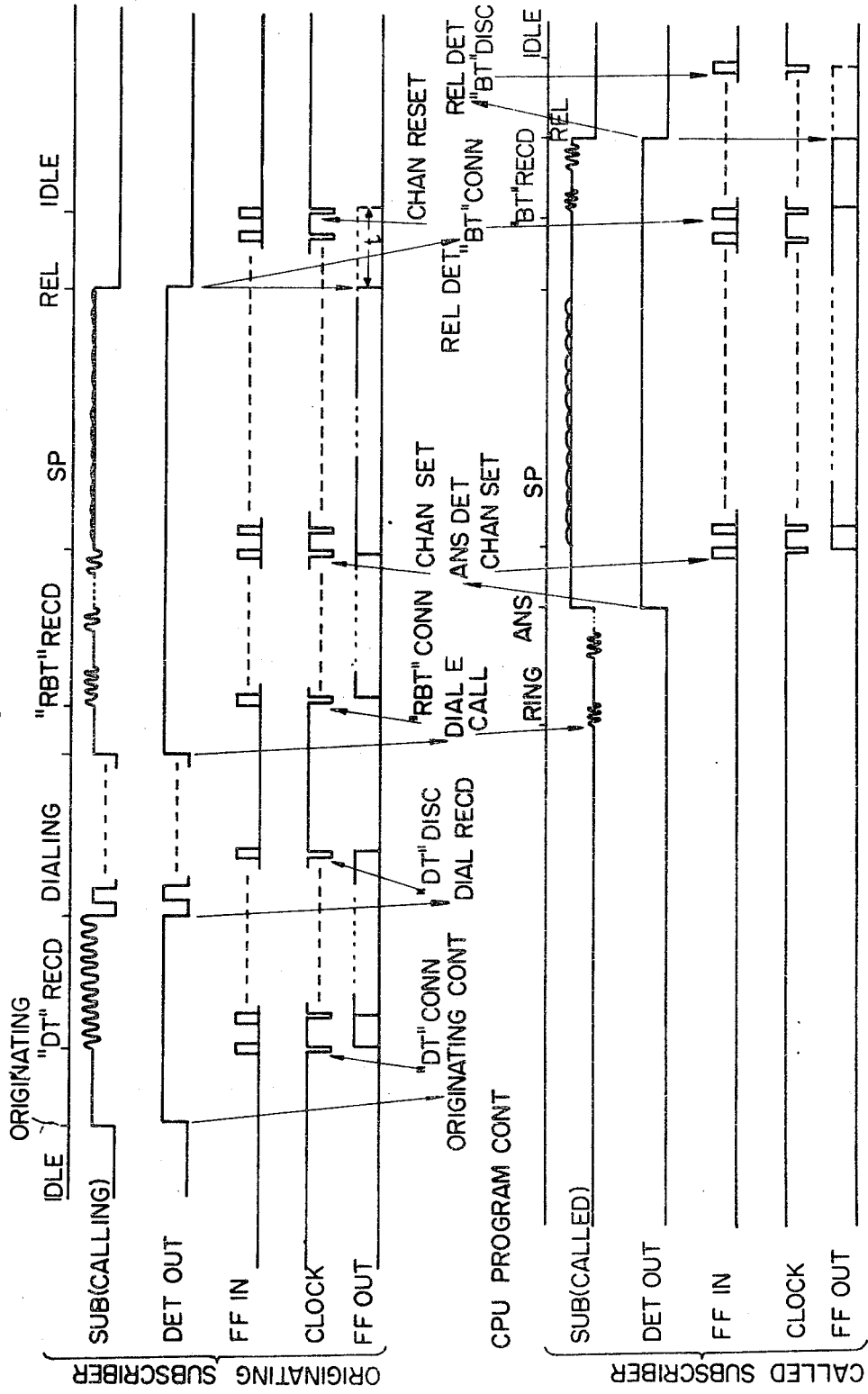

TELEPHONE SWITCHING SYSTEM

BACKGROUND OF THE INVENTION

1. Field of the Invention

This invention relates to a singing preventive system and, more particularly, to a system for preventing singing which is caused by an impedance fluctuation on the two-wire side of a hybrid circuit for two-wire to four-wire conversion in a switching system.

2. Description of the Prior Art

In ordinary telephone circuits, there is widely employed a speech path which forms a loop circuit by inserting two one-direction amplifiers into both transmission and receiving paths on the four-wire side of a hybrid circuit for the two-wire to four-wire conversion, and which connects a subscriber line on two-wire. But, when the impedance side on the two-wire side extremely fluctuates due to condition of the subscriber line, leak from transmission path to receiving path occurs and is amplified to cause singing. FIG. 1 shows an example of such a speech path circuit. That is, two-wire circuits 111 and 114 respectively forming two-wire trunks or line circuits are converted by hybrid circuits (HYB) $1_1$ and $1_2$ to four-wire circuits forming a transmission path 112 and a receiving path 113, respectively, which provide transmission lines to subscribers via amplifiers (AMP) $3_1$, and $3_2$, respectively. The hybrid circuit (HYB) $1_1$ and $1_2$ are balanced by balancing networks (BN) $2_1$ and $2_2$, respectively. It is well-known in the art that, when decrease of return loss of the hybrid circuits (HYB) $1_1$ and $1_2$ is caused by the impedance fluctuation on the two-wire sides, a leak signal is generated and amplified in the loop circuit to generate a singing phenomena, which degrades the speech quality. A method that has been employed to prevent such singing phenomena is to provide attenuators (PAD) $4_1$, $5_1$ and $4_2$, $5_2$ on the two-wire sides and the balancing network sides of the hybrid circuits $1_1$ and $1_2$ for suppressing decrease of return loss, respectively. But this method has the defect that the attenuators are appreciably troublesome to design and hence are expensive.

In the case of applying a recent digital switching system to such a telephone circuit as mentioned above, analog signals sent to the hybrid circuit (HYB) $1_1$ and $1_2$ are converted into digital signal by A-D converters and regenerated by D-A converters which are provided in both the transmission and receiving paths 112 and 113. Also in this case, however, singing similarly occurs.

SUMMARY OF THE INVENTION

This invention is to provide a singing preventive system which is capable of effectively preventing the singing phenomena with a simple structure.

The above objective is achieved by providing a singing preventive system in which a circuit for detecting an impedance fluctuation is inserted in the two-wire circuit, and switching means inserted in the four-wire circuit is actuated by the detecting signal of the detecting circuit to electrically open the four-wire circuit.

BRIEF DESCRIPTION OF THE DRAWINGS

FIG. 5 is a timing diagram explanatory of the operation of a switching system.

DESCRIPTION OF THE PREFERRED EMBODIMENTS

Figure 2:
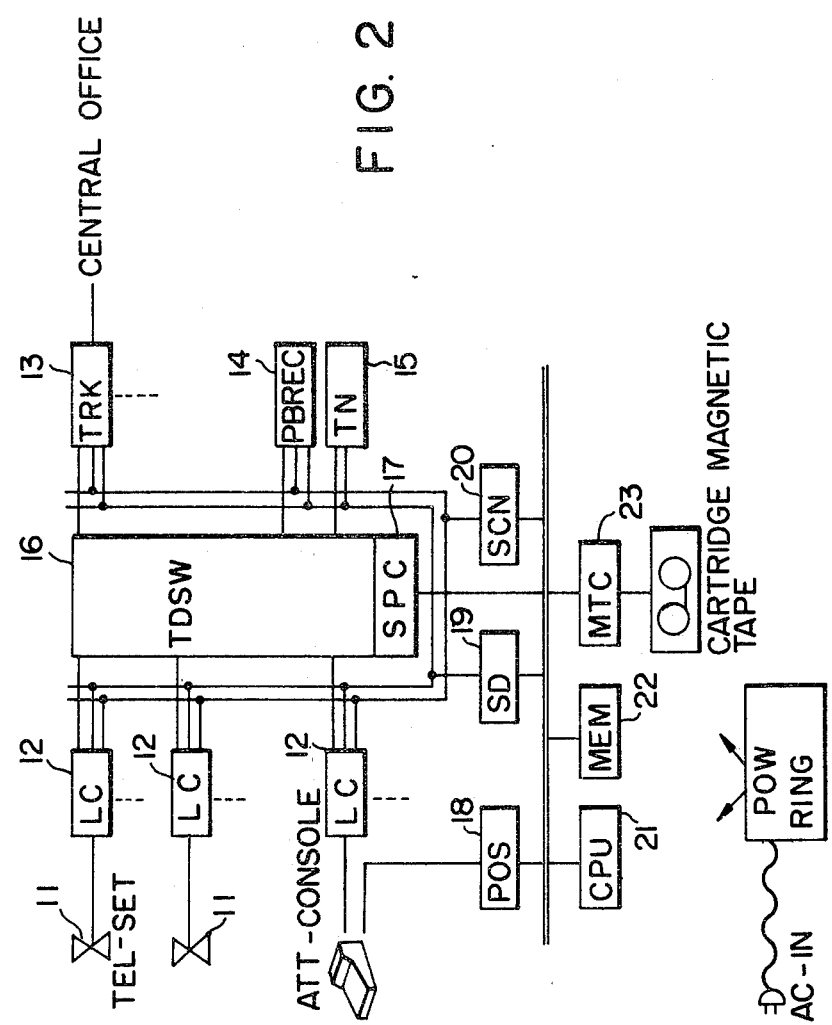
FIG. 2 is a block diagram explanatory of a switching system to which this invention is applied.

FIG. 2 illustrates a detailed block diagram of an ordinary switching system to which this invention is applied.

In FIG. 2, reference numeral 11 indicates a telephone set (TEL-SET); 12 designates a line circuit (LC); 13 identifies a central office trunk (TRK); 14 denotes a PB receiver (PBREC); 15 represents a tone signal trunk (TN); 16 shows a time division switching network (TDSW); 17 refers to a speech path controller (SPC); 18 indicates a position controller (POS); 19 designates a signal distributor (SD); 20 identifies a scanner (SCN); 21 denotes a central processor unit (CPU); 22 represents a main memory (MEM); and 23 shows a cartridge magentic tape controller (MTC).

The illustrated switching system is a time division switching system using a stored program control system which performs a switching operation in accordance with a program. This switching system and its operation are well-known. This invention is directed to the line circuit 12 shown in FIG. 2 but, if required, may also be applied to the central office trunk 13.

Figure 3:
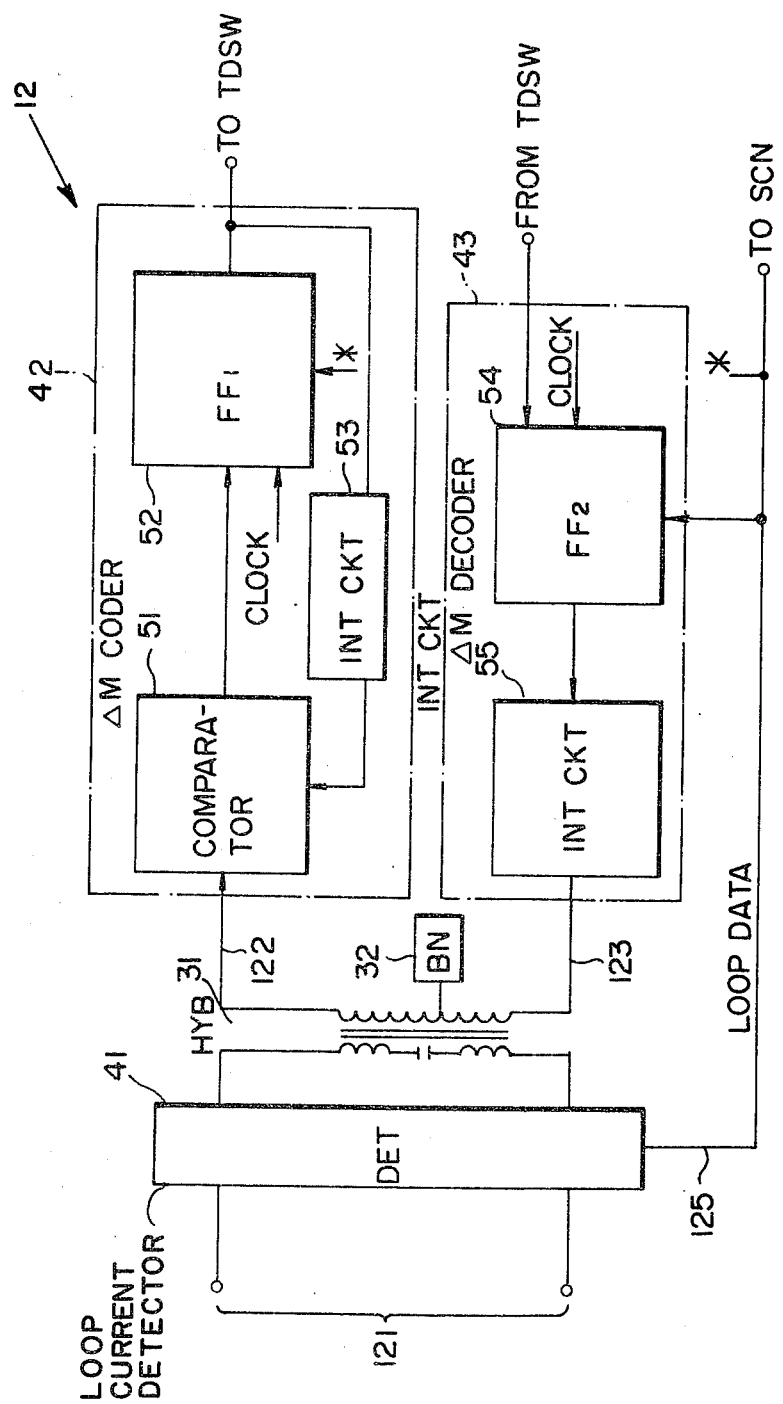
FIG. 3 is a block diagram explanatory of an embodiment of this invention.

FIG. 3 is explanatory of the construction of an embodiment of this invention as being applied to a ΔM time division digital switching system.

In FIG. 3, an analog signal from lines 121 including a telephone set is inputted via a loop current detector (DET) 41 to the primary winding side of a hybrid circuit 31, and the analog output signal from its secondary winding side is applied to a ΔM coder 42 which comprises a comparator 51, a flip-flop (FF$_1$) 52 and an integrator 53 all arranged, for example, in a transmission path 122 of the four-wire circuit (only two wire being shown for the sake of simplicity). The analog signal is quantized by the ΔM coder 42 to convert it into a digital signal, which is applied to a time division switch 16 (FIG. 2) of the digital switching system. In a receiving path 123 (FIG. 3), the digital signal transmitted from the time division switch 16 is converted into an analog signal by a ΔM decoder 43 composed of a flip-flop (FF$_2$) 54 and an integrator 55, and the analog signal is applied to the hybrid circuit (HYB) 31. In this manner, speech signalling is carried out.

In the present embodiment, the flip-flop (FF$_2$) of the ΔM decoder 43 is employed as a circuit opening switch. In this exchanger, the loop current detector 41 of the line circuit 12 detects the on-Hook or off-Hook condition of the telephone by supervision or monitoring of the speech current. In other words, the loop current detector 41 always detects an impedance variation on the line. A low and high impedance detected by the loop current detector 41 are respectively applied as loop closure data and loop open data to a scanning circuit (SCN) 20 (FIG. 2) and to the four-wire circuit. With the loop closure data, the flip-flop (FF$_2$) 54 of the ΔM decoder 43 is reset to electrically open the loop of the four-wire circuit. Thus, singing phenomena due to decrease of a return loss does not occur. In this instance, if the flip-flop 52 of the ΔM coder 42 is also reset (via LOOP DATA—see * in FIG. 3) by the loop open data for preventing that noise generated at the time of opening the loop from being transmitted to the called party, the flip-flop 52 can be held inoperative until a channel being set is reset.

Figure 1:
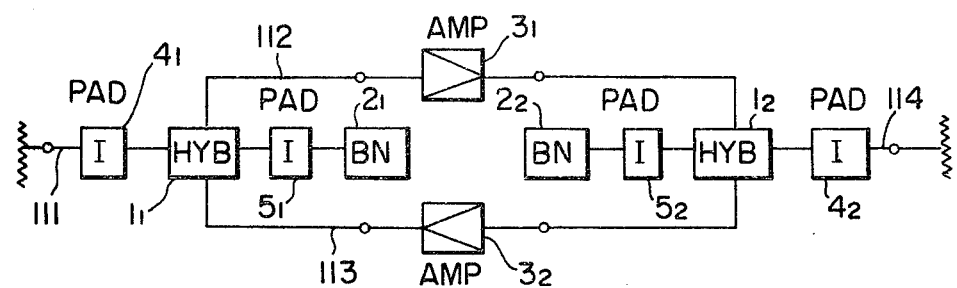
FIG. 1 is a block diagram explanatory of the prior art.
Figure 6:
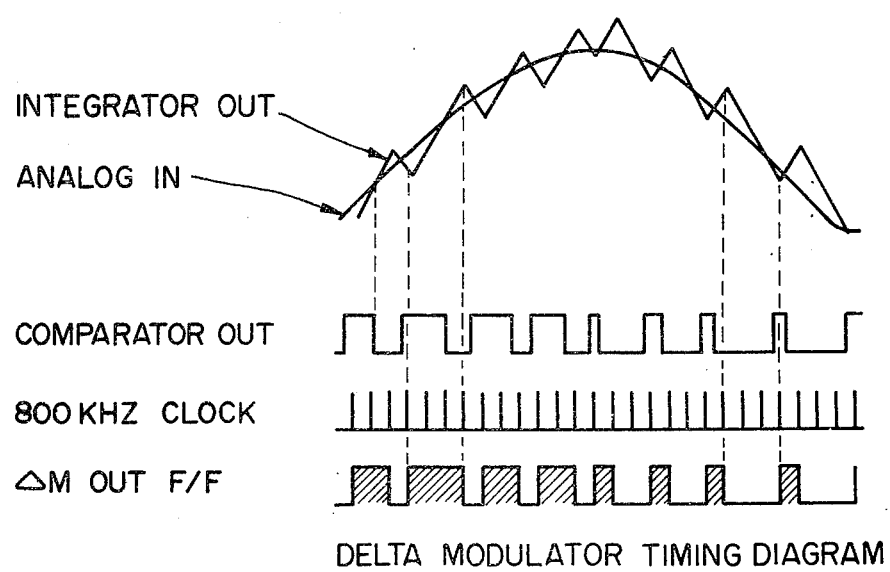
FIG. 6 is a timing diagram explanatory of the operation of a delta modulator.
Figures 4A, 4B:
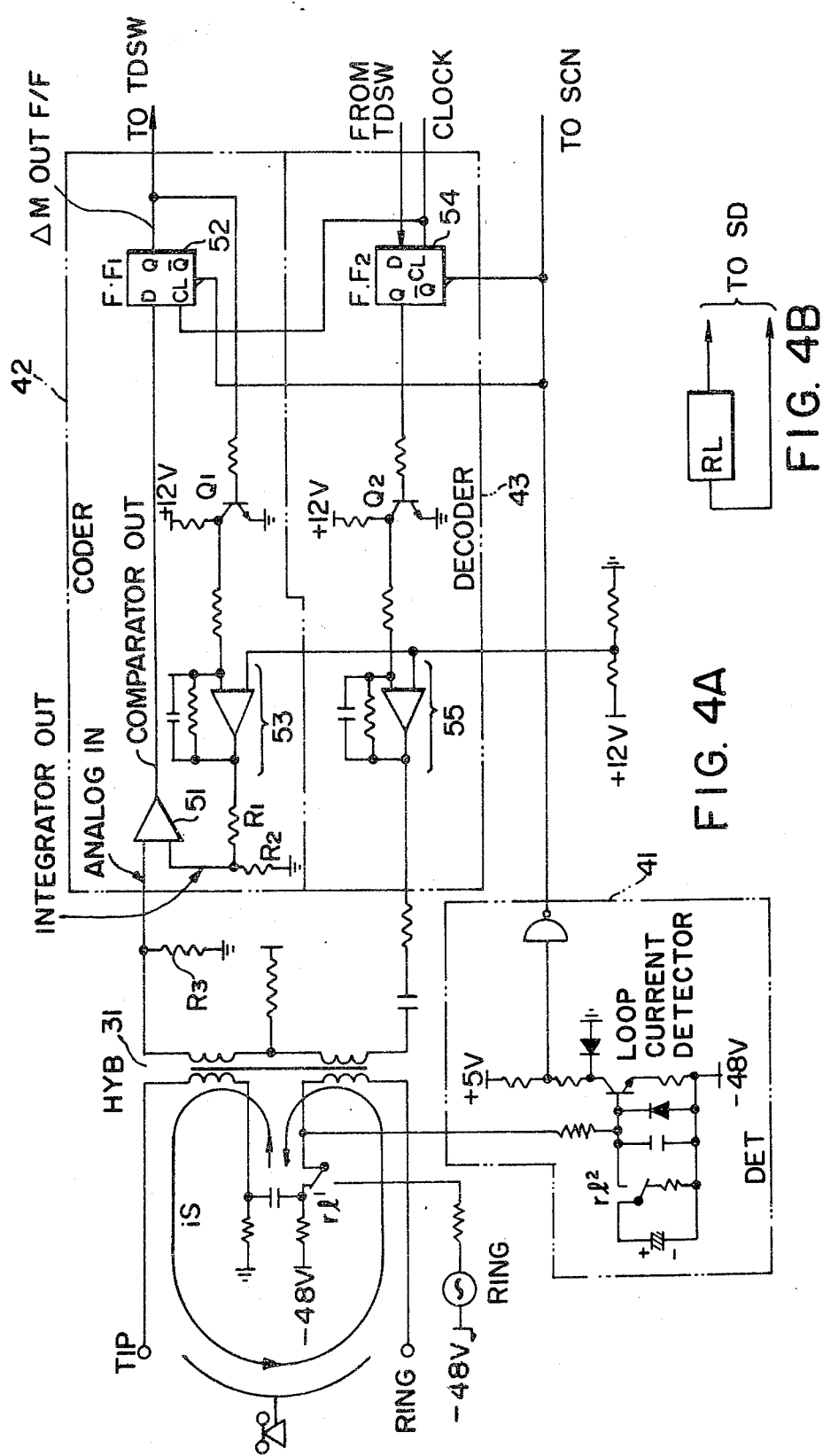
FIGS. 4(A) and (B) show concrete circuit connections of the embodiment depicted in FIG. 3.

For a better understanding of the present embodiment; reference will be made to FIG. 4(A) showing a more detailed circuit diagram, FIG. 4(B) which supplements FIG. 4(A), FIG. 5 which shows a general timing diagram in the case of communication between originating and called subscribers, and FIG. 6 which shows a timing diagram of the delta modulator utilized in FIG. 4(A). In FIG. 4(A), parts corresponding to those in FIG. 3 are identified by the same reference numerals.

When a telephone set goes off-hook, a speech current flows, as indicated by the arrow iS. This will become more apparent from the timing diagram of the subscriber (originating) in FIG. 5. That is, in an idle state, speech current flows to achieve calling. The speech current is detected by the loop current detector 41, and its detected signal is applied to a scanner (SCN) 20 (FIG. 2), from which the signal is transferred as off-hook data to a central processor unit (CPU) 21. Upon reception of the off-hook data, the central processor unit (CPU) 21 connects a dial tone (DT) to the originating subscriber. Then, when the originating subscriber performs dialing, the detector 41 (FIG. 4(A)) detects the dialing as interruption of the speech current, and the resulting signal is fed as dial data to the central processor unit 21 (FIG. 2) via the scanner 20. When the first dialing data has been received, the central processor unit 21 disconnects the dial tone. Upon completion of dialing, the central processor unit 21 calls the subscriber selected by the originating subscriber. The central processor unit 21 intermittently operates a relay RL shown in FIG. 4(B) so as to open and close a ringing gate via a signal distributor which is connected to the called subscriber. Since the relay RL has contacts rl$^1$ and rl$^2$ shown in FIG. 4(A), these contacts are also intermittently operated. Accordingly, when the relay RL operates, the ringing gate (the contact rl$_1$) is closed to supply therethrough a ringing current to the called telephone set for the purpose of actuating its ringer. In this case, a ring-back tone (RBT) is connected to the originating subscriber. Upon answering of the called subscriber, that is, when the called telephone set goes off-hook, the loop current detector 41 on the side of the called subscriber detects the flowing of a DC current (a speech current) regardless of the operation of the relay RL, and sends ring-trip data via the scanner 20 (FIG. 2) to the central processor unit 21. Upon reception of the scanner output, which is indicative of the called subscriber having answered, the central processor unit 21 establishes a channel from the originating subscriber to the called subscriber.

After the channel has been established, a voice signal from the telephone set appears across a resistor R3 via the hybrid circuit 31. For the analog-to-digital and the digital-to-analog conversion of the voice signal, the embodiment of FIG. 4(A) employs a linear delta modulator 42 having a sampling rate of 800 KHz. The sampling rate need not always be limited specifically to 800 KHz but may also be selected as desired.

The analog-to-digital conversion is carried out by the ΔM coder 42, which comprises a comparator 51, a sampler (that is, a flip-flop (FF$_1$) 52), and an integrator 53. The comparator 51 compares the voice input signal level with an analog signal reproduced by the integrator 53 and outputs a high or low level depending upon whether or not the voice input signal is higher in level than the analog signal. The flip-flop 52 is a so-called D-type flip-flop, and therefore, samples the output signal from the comparator 51 at the time of rising of a clock pulse of 800 KHz and, as a result, provides a sampled output ΔM digital signal. The output of the flip-flop 52 is subjected to level conversion by a transistor Q$_1$ and then applied to the integrator 53. The transistor Q$_1$ outputs V$_H$ (approximately +12 Vdc) or V$_L$ (approximately 0 Vdc) depending upon whether the output data from the flip-flop 52 is low or high in level. The integrator 53 is preferably a Miller integrator using an operational amplifier. The ΔM digital signal converted in level by the transistor Q$_1$ is applied to the integrator 53—which is a negative integrator—so as to be regenerated as an analog signal. The output from the integrator 53 is voltage-divided by resistors R$_1$ and R$_2$ and then applied to the reference input of comparator 51. The comparator 51 compares the voice signal and the voltage-divided integrator (53) output with each other so that the integrator output signal may follow up the voice input signal. The ΔM coder 42 provides a ΔM signal amplified $(1+(R_1/R_2))$ times the voice input signal.

The digital-to-analog conversion is achieved by the ΔM decoder 43, which comprises a flip-flop 54 and an integrator 55. The ΔM signal received from a time division switching network (TDSW) 16 (FIG. 2) is latched by the D-type flip-flop 54 (FIG. 4(A)). The flip-flop 54 holds the data, for example, for 1.25 μs, and then supplies the data to a transistor Q$_2$ for level conversion. The data is provided to the integrator 55 after the level conversion by the transistor Q$_2$. The integrator 55 is identical in construction with the integrator 53 of the coder 42 and reproduces exactly the same analog signal as the integrator (53) output of the coder 42 of the terminating subscriber. The analog signal thus reproduced is applied via the hybrid circuit to the telephone set. A better understanding of the operation of the delta modulator will be obtained by referring to FIG. 6 which illustrates the signals appearing at various positions depicted in FIG. 4(A).

For example, after the originating subscriber has been released as described above, the channel is reset after a certain period of time, as indicated by time t (see FF OUT) in FIG. 5. If the central processor unit immediately resets the channel upon receipt of on-hook data, speech cannot be continued even in the case of an erroneous instantaneous on-hook condition, and it is impossible for the subscriber, by hooking, to talk with a new party that is, a party other than the party connected—until this certain period of time has passed. The time t is usually selected to be several hundred msec. Accordingly, singing is very likely to occur in this period.

In the above embodiment, however, the flip-flops 52 and 54 (FIG. 4(A)) are turned off by the detecting signal from the loop current detector 41 so as to cut off the four-wire loop, so that no singing phenomenon occurs. The flip-flops 52 and 54 can be turned off by inputting the detecting signal from the detector 41 to their reset or set terminals. Further, it is also possible to turn off either one of the flip-flops 52 and 54. These flip-flops 52 and 54 and the detector 41 are included in the delta modulator 42 and the line circuit 12 (FIG. 2), and are not specifically provided for this invention. Accordingly, the part of the delta modulator to be changed for this invention is very small.

When a predetermined period of time has elasped after occurrence of the on-hook condition for the originating subscriber, the central processor unit 21 (FIG. 2) assumes that the originating subscriber has released. If the called subscriber is still in an off-hook condition at that time, the central processor unit 21 achieves the busy tone connection to urge the on-hook condition, as seen from FIG. 5. Upon on-hook of the called subscriber, the idle state again occurs, and one speech cycle is completed.

As has been described above, according to this invention, an impedance fluctuation on the two-wire side of a two-wire-to-four-wire converting hybrid circuit is detected to open a switch inserted in a receiving path of a four-wire loop, by which occurrence of singing resulting from decrease of a return loss of the hybrid circuit is completely prevented so as to enable speech of good quality. The opening of the four-wire circuit for preventing singing exerts a bad influence on an amplifier, but this invention settles this problem by the electrical opening of the four-wire circuit. Further, although this invention has been described in connection with a subscriber's circuit, the invention is also applicable to a trunk circuit, as referred to at the beginning of this specification. Moreover, the foregoing description has been given with regard to a digital switching system, but this invention can be applied to an analog switching system.

It will be apparent that many modifications and variations may be effected without departing from the scope of the novel concepts of this invention.

What is claimed is:

1. A switching system comprising at least two subscriber stations connected by a transmission line, each of said at least two subscriber stations comprising a two-wire circuit having a high impedance state and a low impedance state corresponding to an on-hook condition and an off-hook condition, respectively, at said each subscriber station, and hybrid means for converting said two-wire circuit to a four-wire circuit comprising said transmission line; said switching system further comprising:

detecting means, one for each subscriber station, for detecting a change in the impedance state, to said high impedance state, of said two-wire circuit of said each subscriber station, so as to generate a high impedance detecting signal, and switching means inserted in said four-wire circuit responsive to said high impedance detecting signal from the detecting means for electrically opening said four-wire circuit, whereby to prevent singing in said system.

2. A switching system according to claim 1, wherein the two-wire circuit is a subscriber line.

3. A switching system according to claim 2, said system including a line circuit, wherein said subscriber line is connected to said line circuit.

4. A switching system according to claim 1, wherein the two-wire circuit is a trunk line.

5. A switching system according to claim 4, said system including a trunk circuit, wherein said trunk line is connected to said trunk circuit.

6. A switching system according to claim 1, said four-wire circuit including a delta modulator wherein the switching means comprises a flip-flop included in said delta modulator.

7. A switching system according to claim 6, said delta modulator comprising at least a coder portion having a coder flip-flop, wherein the flip-flop of said switching means is said coder flip-flop.

8. A switching system according to claim 6, said delta demodulator comprising at least a decoder portion having a decoder flip-flop, wherein the flip-flop of said switching means is said decoder flip-flop.

9. A switching system according to claim 6, said delta demodulator comprising a coder portion having a coder flip-flop and a decoder portion having a decoder flip-flop, wherein the flip-flop of said switching means is at least one of said coder flip-flop and said decoder flip-flop.

10. A switching system according to claim 1, wherein said two-wire circuit carries a variable level speech current generated by one of said at least two subscriber stations, and wherein the detecting means for detecting the change in said impedance to said high impedance state comprises a circuit for detecting the level of a speech current.

* * * * *